D. M. WINANS.
SUPPORT FOR VEHICLE TOPS.
APPLICATION FILED APR. 30, 1917.
1,273,710.
Patented July 23, 1918.
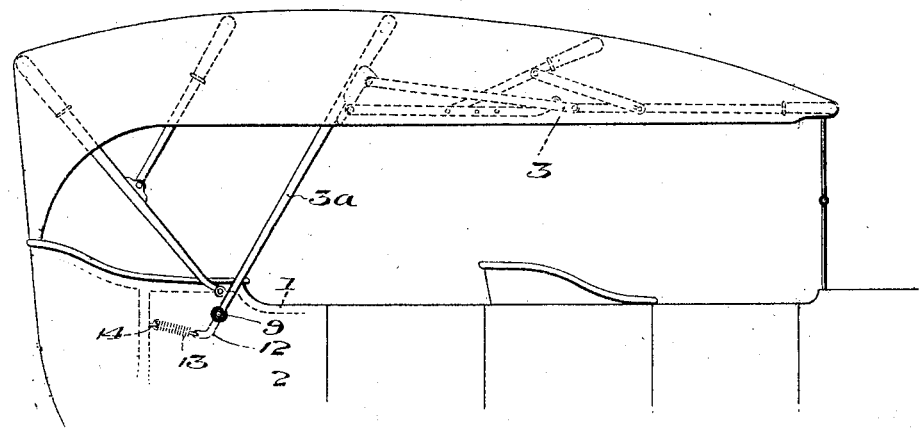
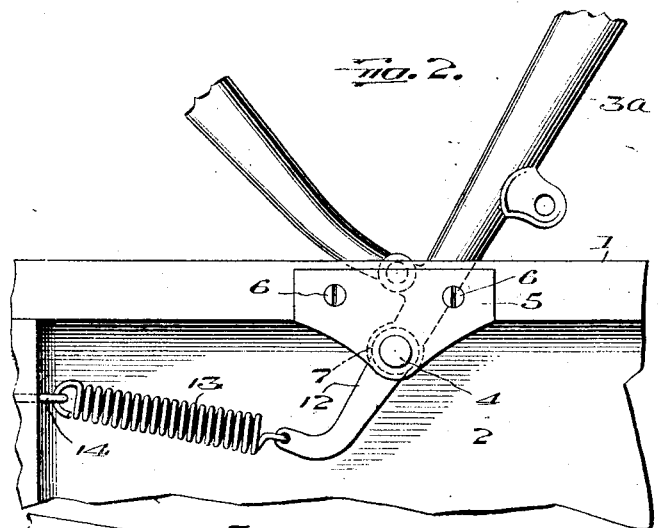
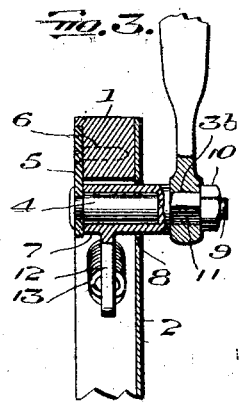
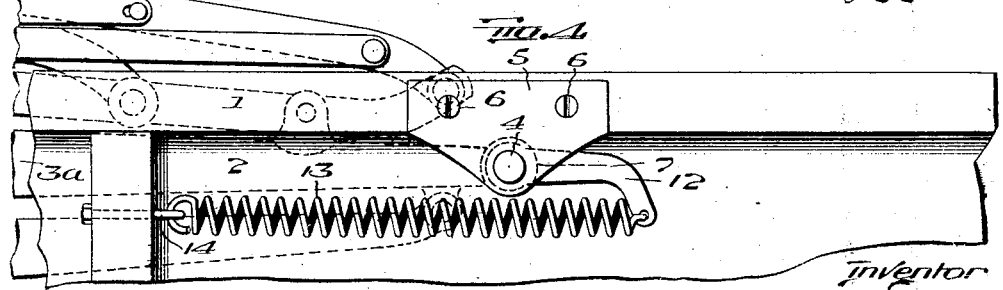

UNITED STATES PATENT OFFICE.

DANIEL M. WINANS, OF BINGHAMTON, NEW YORK.

SUPPORT FOR VEHICLE-TOPS.

1,273,710.　　　　Specification of Letters Patent.　　Patented July 23, 1918.

Application filed April 30, 1917. Serial No. 165,406.

*To all whom it may concern:*

Be it known that I, DANIEL M. WINANS, a citizen of the United States, residing at Binghamton, county of Broome, and State of New York, have invented certain new and useful Improvements in Supports for Vehicle-Tops, of which the following is a specification.

This invention relates to a counterbalancing support for the standards or bow sockets of a foldable vehicle top and is designed for use on vehicles and automobiles.

My object is the provision of oscillatory supports, combined with spring, or other counterbalancing operating means, whereby the top may be quickly and easily raised.

In carrying out my invention I provide oscillating members to which standards or bow sockets of the foldable top may be readily connected. Preferably, a spring, or spring actuated means, is applied to the oscillating members and placed under tension when the vehicle top is folded, the weight of the top then holding it down. When the top is slightly raised, the spring, or spring means, quickly rocks the oscillating members and automatically raises the top. If desired, other counterbalancing means than spring actuated means, or spring means, could be employed for rocking the oscillating members and I do not limit myself to spring actuation of the oscillating members, except where stated in the claims.

Another feature of my invention is the provision of a fixed stud or bearing which may be connected to the body of the vehicle, and an oscillating member, mounted on said stud and constituting a support for the attachment of a main standard or bow socket of a vehicle top. The oscillating member is preferably spring actuated.

My invention enables the stud or bearing to be secured to the frame or body of the vehicle in such manner that it is completely concealed and the oscillating member and actuating means therefor are concealed within the body of the vehicle, the oscillating member having a portion projecting through the shell of the body and adapted for the direct attachment thereto of the main standard of the vehicle top. The present improvements dispense with exterior studs and brackets such as have heretofore been commonly employed at the upper edge or upper portion of the body of a vehicle or automobile for the support of the top, besides providing means for automatically raising the top.

My invention is not limited to use with any particular form of construction of foldable top and permits the use of any desired top therewith.

In place of a fixed stud carried by a plate or bracket, I may use the body iron or brace iron of the vehicle body, or the stud may be attached to the frame of the vehicle body. Modifications may also be resorted to in the form and mounting of the oscillating member and the manner of coöperation of the spring, spring means, or actuating device, therewith. Consequently, the embodiment of the invention hereinafter set forth, and shown in the accompanying drawings, is to be considered as illustrative rather than restrictive, of the scope of the invention.

In the accompanying drawings:

Figure 1 is a side elevation of a portion of an automobile body, showing how my invention supports the foldable top thereof;

Fig. 2 a detail side elevation of the invention showing the top raised, a part of the shell or body of the automobile being removed;

Fig. 3 a detail vertical section through the oscillatory member and certain adjacent parts; and Fig. 4 a view like Fig. 2 showing the top folded.

A portion of the vehicle body or frame is shown at 1 and the shell thereof at 2. The foldable top 3 may be of any construction, that shown being substantially similar to the top set forth in the patent to Charles E. Titchener, No. 1,172,643, dated February 22, 1916, the main bow socket or standard of which is shown at 3ª.

The fixed stud 4 may be the body iron or brace iron of the vehicle body, but it is preferably integral with or fixedly connected to a plate 5 which is secured to the frame 1 by screws or other fastenings 6, being thus in the nature of an attachment which may be applied to the frame or body 1. The stud 4 and plate 5 are thus concealed within the body of the vehicle and covered by the shell 2 so that projecting studs and brackets on the upper edge of the vehicle body, as heretofore commonly employed, are dispensed with.

Rockably mounted on the stud 4 is an oscillatory member 7 which projects freely through an opening 8 in the shell 2 and has a reduced screw-threaded end 9 provided with a nut 10; it also has a squared portion 11. The main standard or bow socket 3ª has a square eye 3ᵇ which is adapted to fit the squared portion 11 so that the said standard 3ª turns with the oscillatory member 7. The nut 10 retains the eye 3ᵇ on the squared portion 11.

The oscillatory member 7 is provided with an arm 12 which has a curved or angularly disposed end to which is connected one end of a coil spring 13 whose other end is fastened by an eye 14 to the frame 1. When the top is folded or lowered, the arm 12 is so disposed that the coil spring 13 exerts tension on the curved or angular end of the arm in a direction substantially parallel to the length of the arm. Consequently the weight of the folded top is sufficient to more than counteract the tension of the two springs employed at opposite sides of the vehicle. On slightly elevating the folded top, the swinging of the oscillatory member 7 moves the arm 12 downwardly so that the spring 13 quickly rocks the member on the stud 4 and automatically raises the top.

Other spring means could be employed and, in its broadest aspect, the invention is not limited to the use of the spring means disclosed for elevating the top, as other counterbalancing means could be employed for that purpose.

The oscillatory support 7 is carried by the vehicle body 1 and is self-contained therewith, said support forming no part of the vehicle top 3 or the bow sockets 3ª thereof. When the body 1 reaches the operatives who are to apply the top 3 thereto, they have only to slip the eyes 3ᵇ of bow-sockets 3ª over the squared parts 11 of the respective oscillatory supports and apply the nuts 10. Likewise, the top may be removed at any time without disturbing the oscillatory member 7.

Having thus described my invention, what I claim as new and desire to secure by Letters Patent is:—

1. In a support for a vehicle top, the combination with the vehicle body, of a fixed stud carried thereby, an oscillatory member rockable thereon, arranged and adapted for the detachable attachment thereto of a vehicle top, and spring means for rocking said oscillatory member.

2. In a support for a vehicle top, the combination with a vehicle frame or body, of oscillatory members carried by and self-contained with the vehicle body and arranged and adapted for the detachable attachment thereto of the standards of a vehicle top, and counterbalancing means for the top co-operating with said oscillatory members.

3. In a support for a vehicle top, the combination with a vehicle frame or body, of spring-actuated oscillatory members for counterbalancing the weight of the top carried by and self-contained with the vehicle body and arranged and adapted for the detachable attachment thereto of the standards of a vehicle top.

In testimony whereof, I hereunto affix my signature.

DANIEL M. WINANS.

Witnesses:
C. E. TITCHENER,
N. A. BOYD.